United States Patent [19]

Oosawa et al.

[11] Patent Number: 5,331,368
[45] Date of Patent: Jul. 19, 1994

[54] PHOTOMICROGRAPHIC APPARATUS

[75] Inventors: Satoru Oosawa; Motokazu Yamana, both of Tokyo, Japan

[73] Assignee: Olympus Optical Co., Ltd., Tokyo, Japan

[21] Appl. No.: 41,476

[22] Filed: Apr. 2, 1993

[30] Foreign Application Priority Data

Apr. 9, 1992 [JP] Japan .................. 4-087398

[51] Int. Cl.$^5$ .............................. G03B 7/08
[52] U.S. Cl. ............................ 354/483; 354/79; 355/68; 355/71
[58] Field of Search .............. 354/79, 482, 483; 355/68, 71

[56] References Cited

U.S. PATENT DOCUMENTS

| 3,906,519 | 9/1975 | Ueda et al. | 354/59 |
| 3,987,463 | 10/1976 | Nishikawa et al. | 354/50 |
| 4,040,067 | 8/1977 | Kondo | 354/23 |

FOREIGN PATENT DOCUMENTS 51-95839  8/1976  Japan .
2-42426   2/1990  Japan .

Primary Examiner—Michael L. Gellner
Assistant Examiner—Daniel R. Malley
Attorney, Agent, or Firm—Frishauf, Holtz, Goodman & Woodward

[57] ABSTRACT

A photomicrographic apparatus, which takes a picture of an enlarged image of a specimen observed under a microscope, causes filter insert/remove means to insert a light intensity-reducing filter in the photometric optical path to a light-receiving element when the light-receiving surface illuminance of the light-receiving element exceeds the upper limit of a first photometry enable illuminance range, and makes the filter insert-/remove driving means remove the light intensity-reducing filter from the photometric optical path to the light-receiving element when the light-receiving surface illuminance of the light-receiving element drops below the lower limit of a second photometry enable illuminance range.

10 Claims, 5 Drawing Sheets

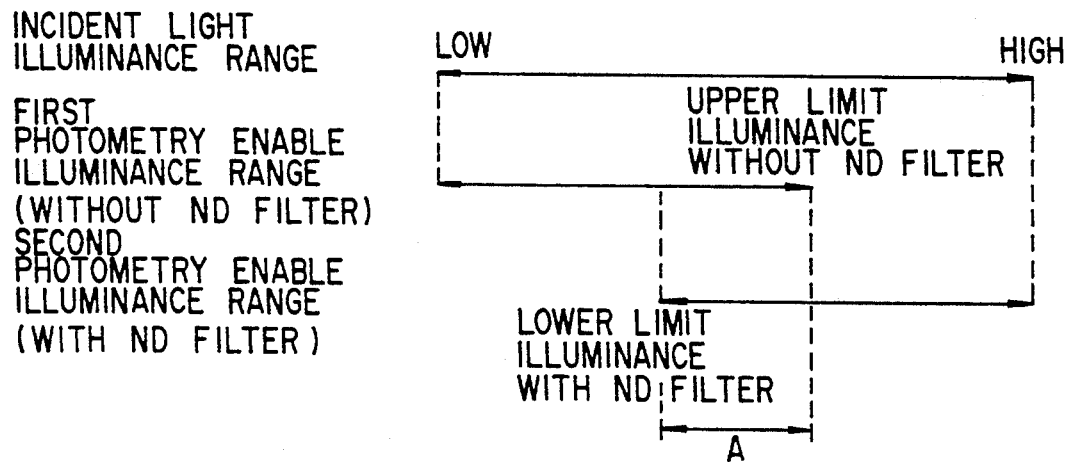
F I G. 2
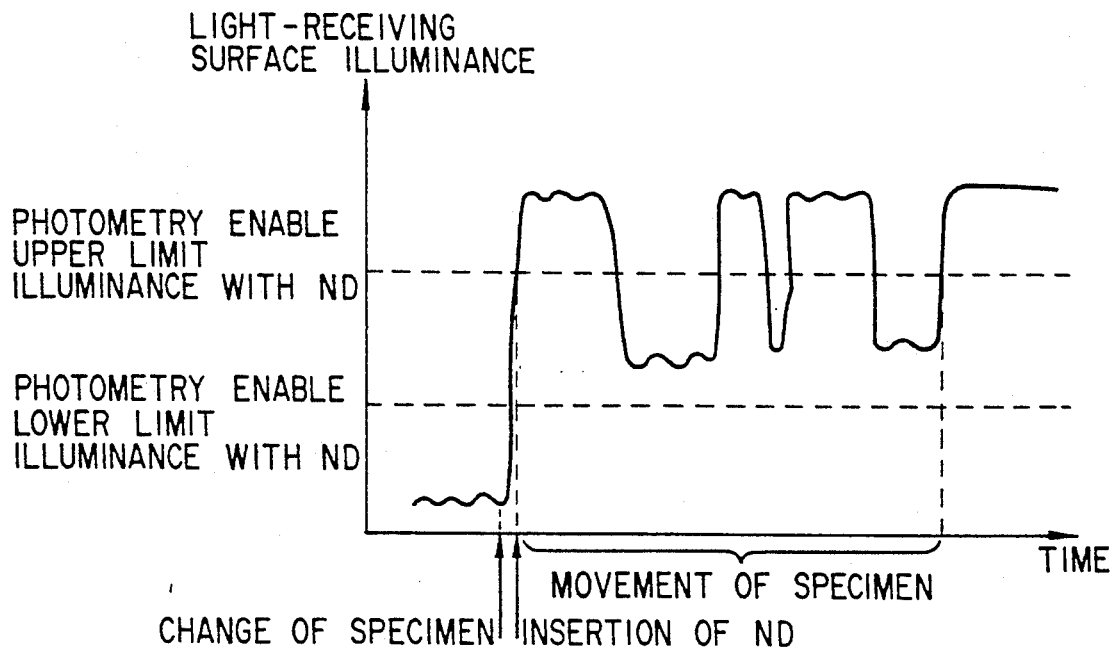
F I G. 3

PHOTOMICROGRAPHIC APPARATUS

BACKGROUND OF THE INVENTION

1. Field of the Invention

This invention relates to a photomicrographic apparatus that takes a picture of an enlarged image of a specimen observed under a microscope.

2. Description of the Related Art

In a photomicrographic apparatus, a photographic apparatus (a camera) is mounted to an observation optical system that optically magnifies a specimen. The photographic apparatus takes a picture of an enlarged image of the specimen magnified by the observation optical system. In some cases, many specimens are observed at a time. In other cases, the observation of the same specimen is made while changing its position. In taking a photograph of such specimens, luminance varies greatly from specimen to specimen observed, as compared with photography by an ordinary photographic apparatus. Similarly, in changing the position of the same specimen, luminance changes. Therefore, taking pictures of specimens requires a photographic apparatus that can measure a very wide illuminance range.

There has been a photographic apparatus suitable for highly luminous specimens. The photographic apparatus is disclosed in Published Unexamined Japanese Patent Applications No. 51-95839 and 2-42426. In those techniques, depending on whether or not the light-receiving surface illuminance of a light-receiving element that senses the luminance at the specimen has reached a predetermined illuminance for insertion and removal of a filter, a light intensity-reducing filter (an ND filter) is inserted in or removed from the photometric optical path to the light-receiving element.

In those techniques, when the light-receiving surface illuminance of the light-receiving element has exceeded the illuminance for the insertion and removal of the filter, the ND filter is inserted in the optical path to the light-receiving element to reduce the light-receiving surface illuminance of the light-receiving element to a photometry enable illuminance range.

With the above techniques, however, the light-receiving surface illuminance of the light-receiving element is close to the illuminance level at which the insertion and removal of the filter takes place. Further, with the techniques, when the specimen is moved for observation, the light-receiving surface illuminance of the light-receiving element increases and decreases with the movement of the specimen.

This means that the ND filter is frequently inserted and removed as the light-receiving surface illuminance of the light-receiving element increases and decreases. As a result, the insert/remove driving mechanism for the ND filter will deteriorate and eventually break down.

SUMMARY OF THE INVENTION

The object of the present invention is to provide a photomicrographic apparatus capable of preventing the deterioration of the insert/remove driving mechanism for the light intensity-reducing filter by avoiding frequent insertion/removal of the light intensity-reducing filter resulting from the change of the light-receiving surface illuminance of the light-receiving element due to the movement of a specimen.

The foregoing object is accomplished by providing a photomicrographic apparatus comprising: an observation optical system for optically magnifying a specimen; a photographic apparatus for receiving a luminous flux from the observation optical system and taking a picture of an enlarged image of the specimen; a light-receiving element for receiving a light flux from the observation optical system and, based on the light-receiving surface illuminance, producing an illuminance signal; a light source for projecting light on the specimen; a light intensity-reducing filter which is inserted in and removed from an optical path running from the light source through the observation optical system to the light-receiving element; and filter insert/remove driving means which, receiving the illuminance signal from the light-receiving element, inserts the light intensity-reducing filter in the optical path when the light-receiving surface illuminance of the light-receiving element exceeds the upper limit of a first photometry enable illuminance range for a case where the light intensity-reducing filter is removed from the optical path, and removes the light intensity-reducing filter from the optical path when the light-receiving surface illuminance of the light-receiving element drops below the lower limit of a second photometry enable illuminance range for a case where the light intensity-reducing filter is inserted in the optical path.

The foregoing object is also accomplished by providing a photomicrographic apparatus comprising: an observation optical system for optically magnifying a specimen; a photographic apparatus for receiving a luminous flux from the observation optical system and taking a picture of an enlarged image of the specimen with a photographic film; an exposure shutter placed in an optical path running from the observation optical system to the photographic apparatus; a shutter open/close driving circuit for opening and closing the exposure shutter; an advance motor for advancing the photographic film; a film advance motor driving circuit for actuating the advance motor; a switch input circuit for entering setting conditions for exposure; a display circuit; an insert circuit which, receiving the illuminance signal from the light-receiving element, issues an insert command to the filter insert/remove driving circuit when the light-receiving surface illuminance of the light-receiving element exceeds the upper limit of a first photometry enable illuminance range with the light intensity-reducing filter removed from the optical path; a remove circuit which issues a remove command to the filter insert/remove driving circuit when the light-receiving surface illuminance of the light-receiving element drops below the lower limit of a second photometry enable illuminance range with the light intensity-reducing filter inserted in the optical path; an exposure circuit for computing an exposure time on the basis of the setting conditions for exposure and the light-receiving surface illuminance of the light-receiving element; a display control circuit for displaying the setting conditions for exposure and the exposure time; a shutter open/close circuit for controlling the shutter open/close driving circuit according to the exposure time when the shutter release is actuated; and an advance circuit for actuating the film advance motor driving circuit after the completion of exposure to advance the photographic film in the photo graphic apparatus.

with the above apparatus, when the light-receiving surface illuminance of the light-receiving element exceeds the upper limit of the first photometry enable illuminance range, the insert circuit actuates the insert- /remove driving motor via the filter insert/remove driving circuit to insert the light intensity-reducing filter in the photometric optical path to the light-receiving receiving element. When the light-receiving surface illuminance of the light-receiving element drops below the lower limit of the second photometry enable illuminance range, the remove circuit actuates the insert-/remove driving motor via the filter insert/remove driving circuit to remove the light intensity-reducing filter from the photometric optical path to the light-receiving element.

BRIEF DESCRIPTION OF THE DRAWINGS

FIG. 2 is a diagram showing a photometry enable illuminance range formed by the ND filter in the apparatus;

FIG. 3 is a diagram showing the way the ND filter is inserted and removed in the apparatus;

DETAILED DESCRIPTION OF THE PREFERRED EMBODIMENTS

Referring to the accompanying drawings, a first embodiment of the present invention will be explained hereinafter.

Figure 1:
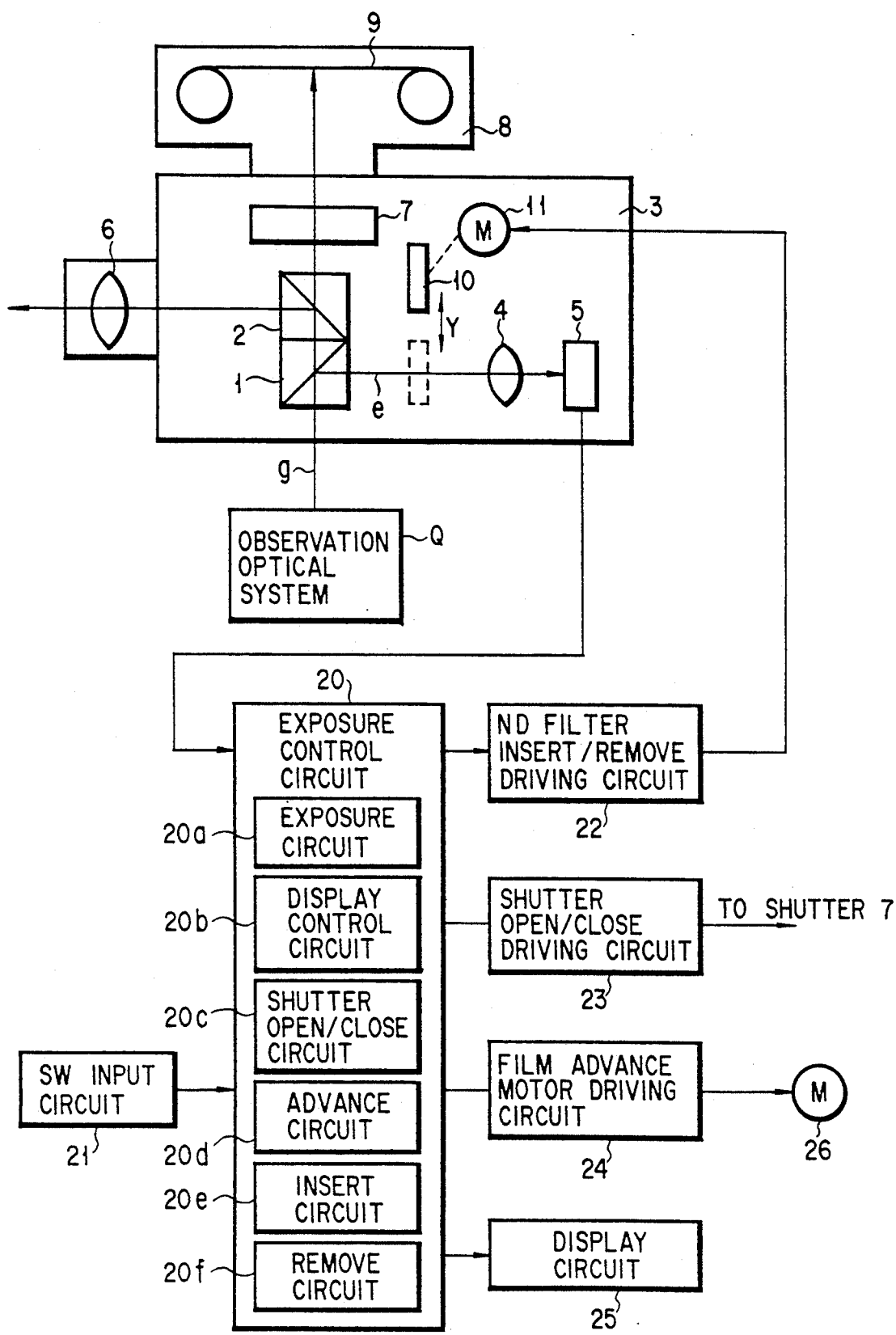
FIG. 1 is a schematic diagram of a photomicrographic apparatus according to a first embodiment of the present invention.

FIG. 1 is a schematic diagram of a photomicrographic apparatus. Prisms 1 and 2 are put in a prism box 3. These prisms 1 and 2 are placed in an optical path of a luminous flux g from the observation optical system Q of a microscope that magnifies a specimen optically.

A projection lens 4 and a light-receiving element 5 are placed in one dispersing path of the prism 1, while a prism 2 is located in the other dispersing path of the prism 1. The light-receiving element consists of a photosensing element such as a photocell, SPD (silicon photodiode) or CCD. When the CCD of a narrow dynamic range is used, a filter with a high light decoy characteristic, such as an ND filter is required. An eyepiece 6 is located in one dispersing path of the prism 2, whereas an exposure shutter 7 is positioned in the other dispersing path of the prism 2. A camera body 8 is in stalled in the optical path running from the prism 2 through the exposure shutter 7. In the camera body 8, a photographic film 9 is loaded.

An ND filter 10 is provided in a prism box 3. The ND filter 10 can move freely in the arrow direction Y. Specifically, the ND filter 10 is provided in the photometric optical path e to the light-receiving element 5 in such a manner that it can be inserted in and removed from the path by means of an insert/remove driving motor 11.

The ND filter 10 has the function of forming an illuminance range A in which a first photometry enable illuminance range of the light-receiving element 5 with the ND filter inserted in the photometric optical path e overlaps with a second photometry enable illuminance range of the light-receiving element 5 with the ND filter removed from the photometric optical path e.

The light-receiving element 5, a switch (SW) input circuit 21, an ND filter insert/remove driving circuit 22, a shutter open/close driving circuit 23, a film advance motor driving circuit 24, and a display circuit 25 are connected to an exposure control circuit 20.

The SW input circuit 21 has the function of entering setting conditions for exposure, including ISO speed and exposure correction conditions.

The ND filter insert/remove driving circuit 22 is for driving the insert/remove driving motor 11.

The shutter open/close driving circuit 23 is for actuating the open/close action of the shutter 7.

The film advance motor driving circuit 24 is for driving a motor for advancing the photographic film 9.

The exposure control circuit 20 has the function of controlling a series of photography. Specifically, the exposure control circuit 20 is provided with an exposure circuit 20a that, receiving the setting conditions for exposure from the SW input circuit 21 and the illuminance signal from the light-receiving element 5, computes an exposure time, a display control circuit 20b that displays the setting conditions for exposure and the exposure time on the display circuit 25, a shutter open/close circuit 20c that drives the shutter open/close driving circuit 23 according to the exposure time when the shutter release is actuated, and an advance circuit 20d that actuates the film advance motor driving circuit 24 after the completion of exposure to advance the photographic film 9.

The exposure control circuit 20 is also provided with an insert circuit 20e that issues an insert command to the ND filter insert/remove driving circuit 22 when the light-receiving surface illuminance of the light-receiving element 5 exceeds the upper limit of the first photometry enable illuminance range, and a remove circuit 20f that issues a remove command to the ND filter insert/remove driving circuit 22 when the light-receiving surface illuminance of the light-receiving element 5 drops below the lower limit of the second photometry enable illuminance range.

Next explained will be the operation of the apparatus thus constructed.

When the luminous flux g from the observation optical system Q enters the prism 1, the prism 1 disperses the luminous flux g in two directions. One luminous flux goes through the projection lens 4 and enters the light-receiving element 5, whereas the other luminous flux enters the prism 2. The prism 2 disperses the incident luminous flux in two directions: one luminous flux is projected on the eyepiece 6, whereas the other luminous flux goes through the exposure shutter 7 and is projected on the photographic film 9.

The light-receiving element 5 produces an illuminance signal corresponding to the light-receiving surface illuminance based on the received luminous flux.

The exposure control circuit 20, receiving the illuminance signal from the light-receiving element 5, judges whether the light-receiving surface illuminance has exceeded the upper limit of the first photometry enable illuminance range or dropped below the lower limit of the second photometry enable illuminance range.

From the result of the judgment, when it is found that the light-receiving surface illuminance of the light-receiving element 5 has exceeded the upper limit of the first photometry enable illuminance range, the insert circuit 20e of the exposure control circuit 20 issues an insert command to the ND filter insert/remove driving circuit 22. Receiving the insert command, the ND filter insert/remove driving circuit 22 actuates the insert/remove driving motor 11 to insert the ND filter 10 in the photometric optical path e to the light-receiving element 5.

On the other hand, when the light-receiving surface illuminance of the light-receiving element 5 has fallen below the lower limit of the second photometry enable illuminance range, the remove circuit 20f of the exposure control circuit 20 issues a remove command to the ND filter insert/remove driving circuit 22. Receiving the remove command, the ND filter insert/remove driving circuit 22 actuates the insert/remove driving motor 11 to remove the ND filter 10 from the photometric optical path e to the light-receiving element 5.

For example, when the specimen is moved in a bright field, or under high luminance conditions, for observation, the light-receiving surface illuminance of the light-receiving element 5 varies near the upper limit of the first photometry enable illuminance range, as shown in FIG. 3.

When the light-receiving surface illuminance has exceeded the upper limit of the first photometry enable illuminance range, the insert circuit 20e of the exposure control circuit 20 actuates the ND filter insert/remove driving circuit 22 to insert the ND filter 10 in the photometric optical path to the light-receiving element 5.

After this, although the light-receiving surface illuminance of the light-receiving element 5 varies near the upper limit of the first photometry enable illuminance range, it will never drop below the lower limit of the second photometry enable illuminance range. As a result, the ND filter 10 remains inserted in the photometric optical path to the light-receiving element 5.

In this state, the exposure circuit 20a of the exposure control circuit 20 computes an exposure time on the basis of the setting conditions to exposure from the SW input circuit 21 and the light-receiving surface illuminance of the light-receiving element 5. After the exposure time is determined, the shutter open/close circuit 20c, when the shutter release is actuated, drives the shutter open/close driving circuit 23 according to the exposure time. After the completion of the exposure, the advance circuit 20d advances the photographic film 9 by actuating the film advance motor driving circuit 24.

with the first embodiment, the ND filter 10 is not repeatedly inserted in and removed from the photometric optical path to the light-receiving element 5 as the light-receiving surface illuminance of the light-receiving element 5 varies with the movement of the specimen for observation. This prevents the deterioration of the ND filter insert/remove driving mechanism composed of the insert/remove driving motor 11 and others.

Figure 4:
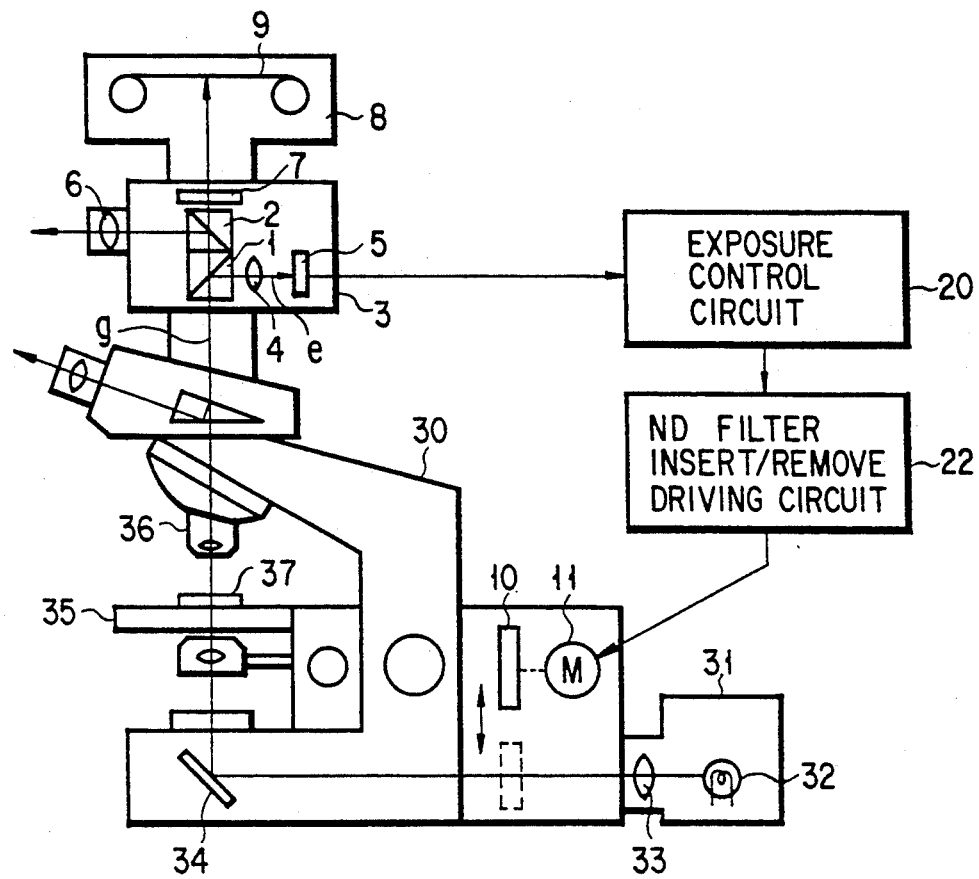
FIG. 4 is a schematic diagram of a photomicrographic apparatus according to a second embodiment of the present invention.

A second embodiment of the present invention will be explained, referring to the overall schematic diagram shown in FIG. 4. The same parts as those in FIG. 1 are indicated by the same symbols and their detailed explanation will be omitted.

A prism box 3 is provided above a microscope support arm 30. A light source unit 31 is provided below the arm 30.

The light source unit 31 is provided with a lamp 32. The rays of light radiated from the lamp 32 pass through a collector lens 33 and are shaped into parallel rays of light. The rays of light are reflected by a mirror 34, go through a plate 35 on which a specimen 37 is placed, pass through the object lens 36 of an observation optical system, and enter the prism 1.

An ND filter 10 is provided between the collector lens 33 and the mirror 34 in such a manner that it can be inserted and removed freely. Specifically, the ND filter 10 is provided so that it can be inserted in and removed from the optical path radiated from the lamp 32 by means of the action of an insert/remove driving motor 11.

It is possible to regard the optical path to the lamp 32 in the same light as the photometric optical path to the light-receiving element 5, because it reaches the light-receiving element 5 by way of the prism 1.

An exposure control circuit 20 is provided with an exposure circuit 20a that computes an exposure time on the basis of the setting conditions for exposure from an SW input circuit 21 and the light-receiving surface illuminance of the light-receiving element 5, a display control circuit 20b that displays the setting conditions for exposure and the exposure time on a display circuit 25, a shutter open/close circuit 20c that drives a shutter open/close driving circuit 23 according to the exposure time when the shutter release is actuated, and an advance circuit 20d that actuates the film advance motor driving circuit 24 after the completion of exposure to advance the photographic film 9.

The exposure control circuit 20 is also provided with an insert circuit 20e that issues an insert command to an ND filter insert/remove driving circuit 22 when the light-receiving surface illuminance of the light-receiving element 5 exceeds the upper limit of the first photometry enable illuminance range, and a remove circuit 20f that issues a remove command to the ND filter insert/remove driving circuit 22 when the light-receiving surface illuminance of the light-receiving element 5 drops below the lower limit of the second photometry enable illuminance range.

The operation of the apparatus thus constructed will be explained.

The exposure control circuit 20, receiving the illuminance signal from the light-receiving element 5, judges whether the light-receiving surface illuminance of the light-receiving element 5 has exceeded the upper limit of the first photometry enable illuminance range or dropped below the lower limit of the second photometry enable illuminance range. From the result of the judgment, when it is found that the light-receiving surface illuminance has exceeded the upper limit of the first photometry enable illuminance range, the insert circuit 20e of the exposure control circuit 20 issues an insert command to the ND filter insert/remove driving circuit 22. The ND filter insert/remove driving circuit 22 actuates the insert/remove driving motor 11 to insert the ND filter 10 in the photometric optical path from the lamp 32.

On the other hand, when the light-receiving surface illuminance of the light-receiving element 5 has fallen below the lower limit of the second photometry enable illuminance range, the remove circuit 20f of the exposure control circuit 20 issues a remove command to the ND filter insert/remove driving circuit 22. The ND filter insert/remove driving circuit 22 actuates the insert/remove driving motor 11 to remove the ND filter 10 from the photometric optical path from the lamp 32.

With the second embodiment, as with the first embodiment, the ND filter 10 is not repeatedly inserted in and removed from the photometric optical path e to the light-receiving element 5 as the light-receiving surface illuminance of the light-receiving element 5 varies with the movement of the specimen for observation. This prevents the deterioration of the ND filter insert-/remove driving mechanism composed of the insert-/remove driving motor 11 and others.

Figure 5:
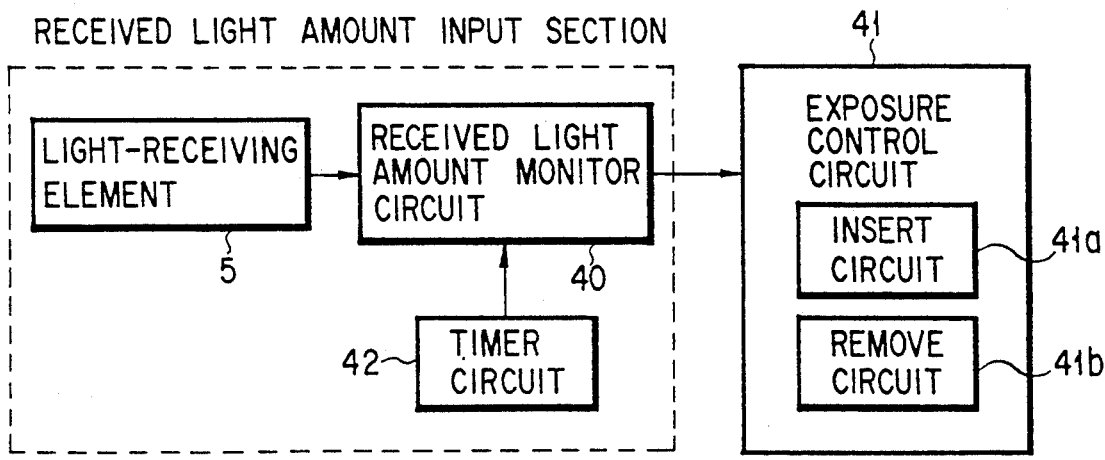
FIG. 5 is a schematic diagram of a photomicrographic apparatus according to a third embodiment of the present invention.

Referring to FIG. 5, a third embodiment of the present invention will be explained. In the figure, only what differs from the construction of FIG. 1 is shown.

A light-receiving element 5 is connected to an exposure control circuit 41 via a received light amount monitor circuit 40. A timer circuit 42 is connected to the received light amount monitor circuit 40.

The timer circuit 42 has the function of sending a time count end signal to the received light amount monitor circuit 40 at regular intervals.

The received light amount monitor circuit 40 has the function of, on arrival of each time count end signal, receiving the illuminance signal from the light-receiving element 5 and sending it to the exposure control circuit 41.

The exposure control circuit 41 is provided with an insert circuit 41a, which takes in the light-receiving surface illuminance of the light-receiving element 5 at regular intervals and issues an insert command to an ND filter insert/remove driving circuit 22 when the light-receiving surface illuminance has exceeded the upper limit of the first photometry enable illuminance range a specified number of times, for example, twice successively, and a remove circuit 41b, which issues a remove command to the ND filter insert/remove driving circuit 22 when the light-receiving surface illuminance has fallen below the lower limit of the second photometry enable illuminance range a specified number of times, for example, twice successively.

Figure 6:
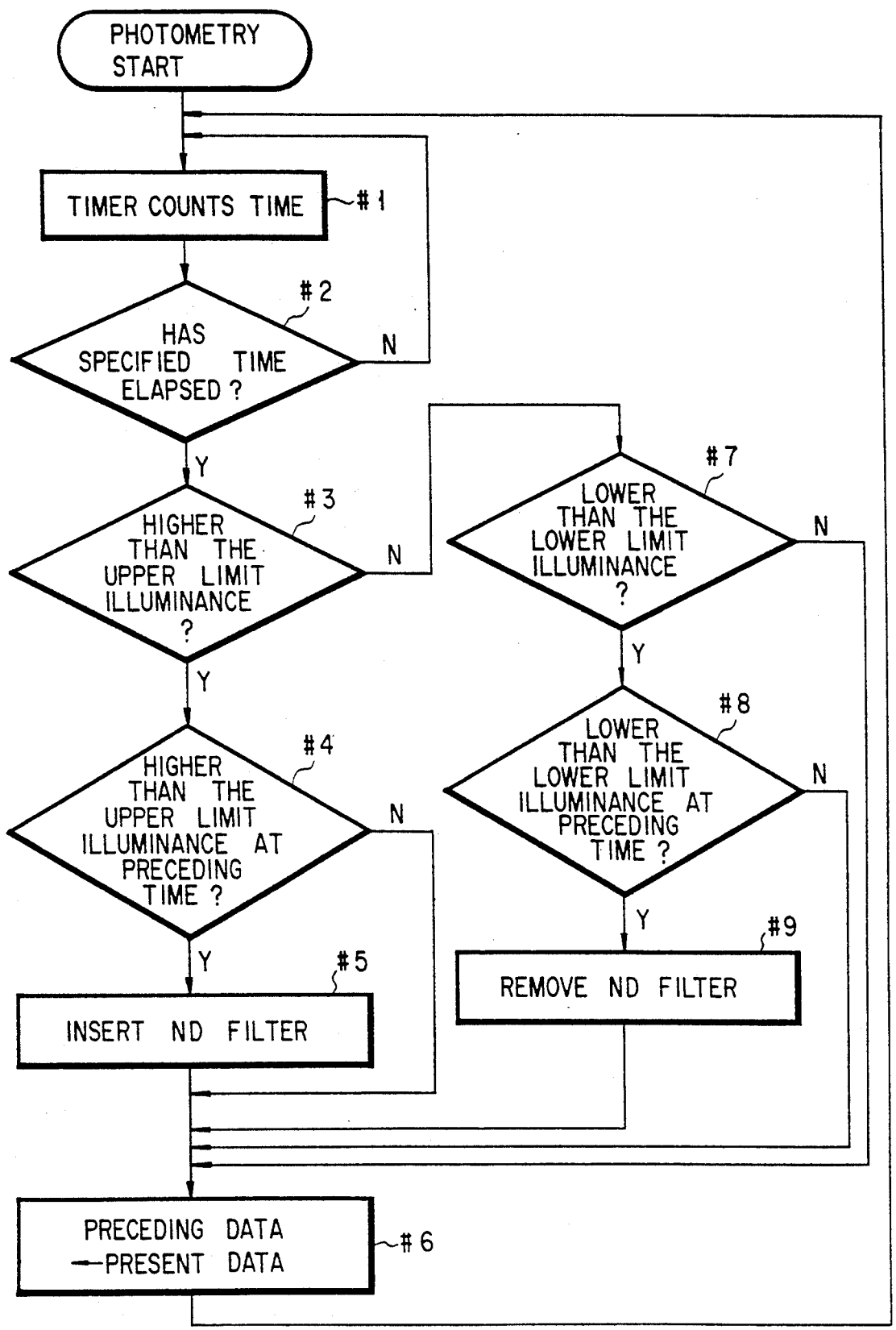
FIG. 6 is a filter insertion/removal flowchart for the apparatus.

The operation of the apparatus thus constructed will be explained, using the flowchart shown in FIG. 6.

At step #1, the timer circuit 42 counts time and at step #2, sends a time count end signal each time a specified time has elapsed.

The received light amount monitor circuit 40, receiving the time count end signal from the timer circuit 42, takes in the illuminance signal from the light-receiving element 5 and sends it to the exposure control circuit 41.

At step #3, the exposure control circuit 41 judges whether or not the light-receiving surface illuminance of the light-receiving element 5 has exceeded the upper limit of the first photometry enable illuminance range.

As a result of this judgment, when it is found that the light-receiving surface illuminance has exceeded the upper limit illuminance, the exposure control circuit 41 goes to step #4 and judges whether or not the light-receiving surface illuminance of the light-receiving element 5 exceeded the upper limit of the first photometry enable illuminance range in the preceding judgment on the light-receiving surface illuminance.

As a result of this judgment, when it is found that on the light-receiving surface illuminance also exceeded the upper limit illuminance in the preceding judgment, that is, the light-receiving surface illuminance has exceeded the upper limit illuminance twice successively, the insert circuit 41a of the exposure control circuit 41 goes to step #5 and issues an insert command to the ND filter insert-/remove circuit 22. The ND filter insert/remove driving circuit 22 actuates the insert/remove driving motor 11 to insert the ND filter 10 in the photometric optical path to the light-receiving element 5.

At step #6, the exposure control circuit 41 deletes the preceding light-receiving surface illuminance and at the same time, stores the present light-receiving surface illuminance.

As a result of the judgment at step #3, when it is found that the light-receiving surface illuminance of the light-receiving element 5 has not exceeded the upper limit of the first photometry enable illuminance range, the exposure control circuit 41 proceeds to step #7 and judges whether or not the light-receiving surface illuminance has dropped below the lower limit of the second enable illuminance range.

As a result of this judgment, when it is found that the light-receiving surface illuminance has fallen below the lower limit illuminance, the exposure control circuit 41 goes to step #8 and judges whether or not the light-receiving surface illuminance of the light-receiving element 5 dropped below the lower limit of the second photometry enable illuminance range in the preceding judgment of the light-receiving surface illuminance. As a result of this judgment, when it is found that the light-receiving surface illuminance also dropped below the lower limit illuminance in the preceding judgment, that is, the light-receiving surface illuminance has fallen below the lower limit illuminance twice successively, the remove circuit 41b of the exposure control circuit 41 proceeds to step #9 and issues a remove command to the ND filter insert/remove driving circuit 22. The ND filter insert/remove driving circuit 22 actuates the insert/remove driving motor 11 to remove the ND filter 10 from the photometric optical path to the light-receiving element 5.

When the light-receiving surface illuminance of the light-receiving element 5 has neither exceeded the upper limit of the first photometry enable illuminance range twice successively, nor dropped below the lower limit of the second photometry enable illuminance range twice successively, the exposure control circuit 41, at step #6, deletes the preceding light-receiving surface illuminance and at the same time, stores the present light-receiving surface illuminance.

Figure 7:
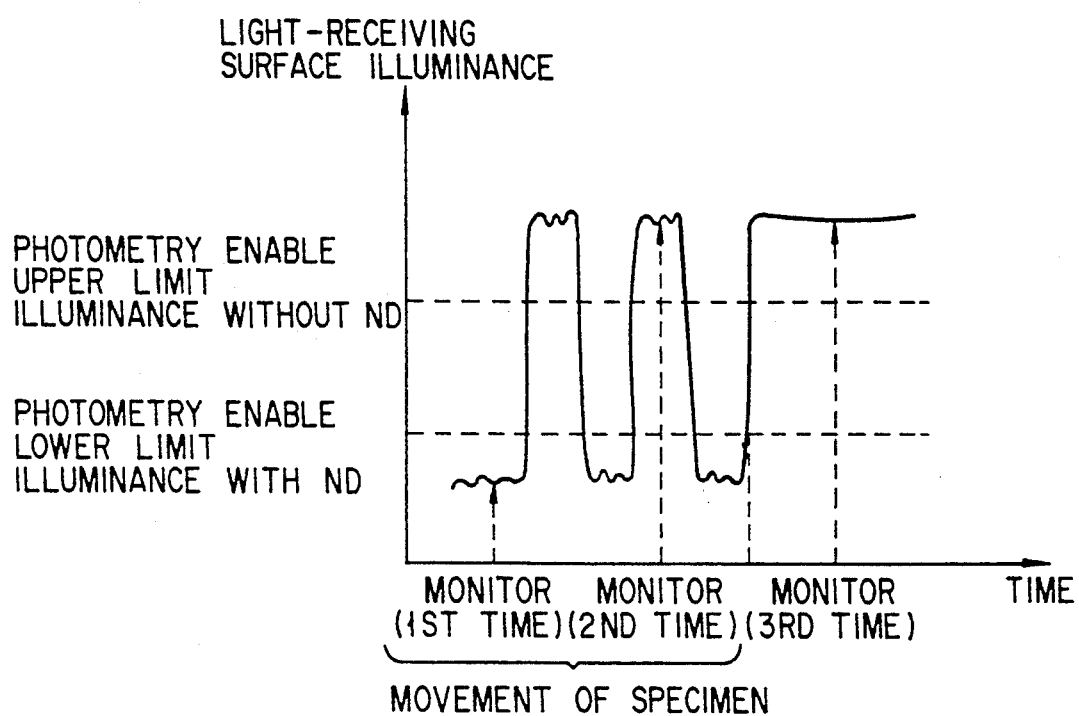
FIG. 7 is a diagram showing the way the ND filter is inserted and removed in the apparatus.

Explained will be a case where the light-receiving surface illuminance of the light-receiving element 5 varies as shown in FIG. 7, for example, as the light-receiving element 5 is moved for observation.

The exposure control circuit 41 judges that the light-receiving surface illuminance of the light-receiving element 5 has dropped below the lower limit of the second photometry enable illuminance range at the first illuminance monitoring, and has exceeded the upper limit of the first photometry enable illuminance range at the second illuminance monitoring. At this time, the exposure control circuit 41 not actuate the ND filter insert/remove driving circuit 22.

At the third illuminance monitoring, the light-receiving surface illuminance has exceeded the upper limit of the first photometry enable illuminance range. At this time, the exposure control circuit 41 judges that the light-receiving surface illuminance has exceeded the upper limit of the first photometry enable illuminance range twice successively. The exposure control circuit 41 actuates the ND filter insert/remove driving circuit 22 to insert the ND filter 10 in the photometric optical path to the light-receiving element 5.

With the third embodiment, excessive repetition of insertion and removal of the ND filter 10 can be prevented when the light-receiving surface illuminance varies due to the movement of the specimen for observation. This prevents useless insertion and removal of the ND filter 10 when the light-receiving surface illuminance is unstable.

The present invention is not limited to the above embodiments, but may be practiced or embodied in still other ways without departing from the spirit or essential character thereof. For instance, the light intensity-reducing filter is not restricted to an ND filter. Other types of filters and diaphragms may be used to reduce the intensity of light. The exposure time for a case where the ND filter is inserted may be computed by making correction based on the light-intensity reduction index of the ND filter. Further, the number of ND filter is not limited to one. More than one ND filter may be used to expand the photometry enable illuminance range.

While in the third embodiment, the light-receiving surface illuminance has exceeded, for example, the upper limit of the first photometry enable illuminance range twice successively, the number of times is not limited to twice but may be set to a desired number of times.

What is claimed is:

1. A photomicrographic apparatus comprising:
   an observation optical system for optically magnifying a specimen;
   a photographic apparatus for receiving a luminous flux from the observation optical system and taking a picture of an enlarged image of said specimen;
   a light-receiving element for receiving a light flux from the observation optical system and, based on the light-receiving surface illuminance, producing an illuminance signal;
   a light source for projecting light on said specimen;
   a light intensity-reducing filter which is inserted in and removed from an optical path running from the light source through said observation optical system to said light-receiving element; and
   filter insert/remove driving means which, receiving said illuminance signal from said light-receiving element, inserts said light intensity-reducing filter in said optical path when the light-receiving surface illuminance of said light-receiving element exceeds the upper limit of a first photometry enable illuminance range for a case where said light intensity-reducing filter is removed from said optical path, and removes said light intensity-reducing filter from said optical path when the light-receiving surface illuminance of said light-receiving element drops below the lower limit of a second photometry enable illuminance range for a case where said light intensity-reducing filter is inserted in said optical path.

2. A photomicrographic apparatus according to claim 1, wherein said light intensity-reducing filter forms an illuminance range where the first photometry enable illuminance range of said light-receiving element with said light intensity-reducing filter inserted in said optical path overlaps with the second photometry enable illuminance range of said light-receiving element with said light intensity-reducing filter removed from said optical path.

3. A photomicrographic apparatus according to claim 1, wherein said light intensity-reducing filter is inserted in and removed from the photometric optical path between said observation optical system and said light-receiving element.

4. A photomicrographic apparatus according to claim 1, wherein said light intensity-reducing filter is inserted in and removed from the photometric optical path between said light source and said observation optical system.

5. A photomicrographic apparatus according to claim 1, wherein said light intensity-reducing filter comprises an ND filter.

6. A photomicrographic apparatus according to claim 1, wherein said filter insert/remove driving means comprises:
   an insert/remove driving motor for inserting and removing said light intensity-reducing filter in and from the photometric optical system;
   a filter insert/remove driving circuit for actuating the insert/remove driving motor; and
   an exposure control circuit which, receiving the illuminance signal from said light-receiving element, issues an insert command to said filter insert/remove driving circuit when the light-receiving surface illuminance of said light-receiving element exceeds the upper limit of said first photometry enable illuminance range, and issues a remove command to said filter insert/remove driving circuit when the light-receiving surface illuminance of said light-receiving element drops below the lower limit of said second photometry enable illuminance range.

7. A photomicrographic apparatus according to claim 6, wherein said exposure control circuit comprises:
   an exposure circuit for computing an exposure time on the basis of the setting conditions for exposure and the light-receiving surface illuminance of said light-receiving element;
   a display control circuit for displaying the setting conditions for exposure and the exposure time;
   a shutter open/close circuit for providing open/close control of a shutter according to said exposure time when the shutter release is actuated; and
   an advance circuit for advancing the photographic film within said photographic apparatus after the completion of exposure.

8. A photomicrographic apparatus according to claim 1, wherein said filter insert/remove driving means has the function of inserting the light intensity-reducing filter in the optical path when the light-receiving surface illuminance of said light-receiving element has exceeded the upper limit of the first photometry enable illuminance range a specified number of times successively, and removing the light intensity-reducing filter from the optical path when the light-receiving surface illuminance of said light-receiving element has dropped below the lower limit of the second photometry enable illuminance range a specified number of times successively.

9. A photomicrographic apparatus according to claim 1, wherein said filter insert/remove driving means comprises:
   a timer circuit for producing a time count end signal at regular intervals;
   a received light amount monitor circuit which, each time receiving the time count end signal from the timer circuit, allows the illuminance signal from said light-receiving element to pass;
   an insert circuit for taking in the illuminance signal from the received light amount monitor circuit and issuing an insert command to the filter insert/remove driving circuit when the light-receiving surface illuminance of said light-receiving element has exceeded the upper limit of said first photometry enable illuminance range a specified number of times successively; and a remove circuit for taking in the illuminance signal from the received light amount monitor circuit and issuing a remove command to the filter insert/remove driving circuit when the light-receiving surface illuminance of said light-receiving element has dropped below the lower limit of said second photometry enable illuminance range a specified number of times successively.

10. A photomicrographic apparatus comprising:

an observation optical system for optically magnifying a specimen;

a photographic apparatus for receiving a luminous flux from the observation optical system and taking a picture of an enlarged image of said specimen with a photographic film;

an exposure shutter placed in an optical path running from said observation optical system to said photographic apparatus;

a shutter open/close driving circuit for opening and closing the exposure shutter;

an advance motor for advancing said photographic film;

a film advance motor driving circuit for actuating the advance motor;

a switch input circuit for entering setting conditions for exposure;

a display circuit;

an insert circuit which, receiving said illuminance signal from said light-receiving element, issues an insert command to said filter insert/remove driving circuit when the light-receiving surface illuminance of said light-receiving element exceeds the upper limit of a first photometry enable illuminance range with said light intensity-reducing filter removed from said optical path;

a remove circuit which issues a remove command to said filter insert/remove driving circuit when the light-receiving surface illuminance of said light-receiving element drops below the lower limit of a second photometry enable illuminance range with said light intensity-reducing filter inserted in said optical path;

an exposure circuit for computing an exposure time on the basis of the setting conditions for exposure and the light-receiving surface illuminance of said light-receiving element;

a display control circuit for displaying the setting conditions for exposure and the exposure time;

a shutter open/close circuit for controlling said shutter open/close driving circuit according to said exposure time when the shutter release is actuated; and an advance circuit for actuating said film advance motor driving circuit after the completion of exposure to advance said photographic film in said photographic apparatus.

* * * * *